(12) United States Patent
Smith et al.

(10) Patent No.: US 10,100,509 B2
(45) Date of Patent: Oct. 16, 2018

(54) MODULAR ENCLOSURE TRANSFER SYSTEM INCLUDING ROLLERS

(71) Applicant: NORTHERN STAR INDUSTRIES, INC., Iron Mountain, MI (US)

(72) Inventors: Larry Smith, Iron Mountain, MI (US); Gary Pennala, Iron Mountain, MI (US)

(73) Assignee: NORTHERN STAR INDUSTRIES, INC., Iron Mountain, MI (US)

( * ) Notice: Subject to any disclaimer, the term of this patent is extended or adjusted under 35 U.S.C. 154(b) by 16 days.

(21) Appl. No.: 15/446,546

(22) Filed: Mar. 1, 2017

(65) Prior Publication Data

US 2017/0254066 A1    Sep. 7, 2017

Related U.S. Application Data

(60) Provisional application No. 62/301,897, filed on Mar. 1, 2016.

(51) Int. Cl.
| | | |
|---|---|---|
| *B60P 1/64* | (2006.01) | |
| *E02D 27/00* | (2006.01) | |
| *E04B 1/343* | (2006.01) | |
| *B66F 3/46* | (2006.01) | |
| *B60P 1/02* | (2006.01) | |
| *E04G 23/06* | (2006.01) | |
| *E04G 21/16* | (2006.01) | |
| *B65G 7/02* | (2006.01) | |

(52) U.S. Cl.
CPC ............ *E04B 1/34336* (2013.01); *B60P 1/02* (2013.01); *B66F 3/46* (2013.01); *E04G 21/163* (2013.01); *E04G 23/065* (2013.01); *B65G 7/02* (2013.01)

(58) Field of Classification Search
CPC ........ E04G 23/06; B66F 1/025; E21B 15/003; F16H 21/08; Y10T 74/1598
USPC ........... 104/134; 238/13; 254/45; 280/43.17, 280/43.23; 384/548, 558; 414/10–12; 52/122.1, 745.02
See application file for complete search history.

(56) References Cited

U.S. PATENT DOCUMENTS

| | | | |
|---|---|---|---|
| 295,921 A | 4/1884 | Hollingsworth | |
| 689,363 A | 12/1901 | McDonner | |
| 3,033,525 A | 5/1962 | Johnson | |
| 3,231,121 A * | 1/1966 | Powell | E04G 21/161 280/789 |
| 3,587,890 A * | 6/1971 | Hyland | E04G 21/161 238/13 |
| 3,743,120 A * | 7/1973 | Schmidt | B60P 1/02 238/13 |

(Continued)

FOREIGN PATENT DOCUMENTS

WO    WO-2015026246 A2 *    2/2015    ........... B65D 90/143

*Primary Examiner* — Gregory W Adams
(74) *Attorney, Agent, or Firm* — Marshall, Gerstein & Borun LLP

(57) ABSTRACT

A crane-free system for moving a pre-fabricated enclosure includes a beam system and a system of coordinated self-contained hydraulic jack units, which in conjunction allow a pre-fabricated enclosure to be lifted off a semi-trailer, positioned by rolling on the system of beams above a pre-laid foundation, and lowered to the foundation. Optionally, the sliding beam system may be rotated using rotatable rollers to allow the pre-fabricated enclosure to move in a rotated direction. Optionally, a centering device and hydraulic ram may be used to center the pre-fabricated enclosure on the foundation.

8 Claims, 11 Drawing Sheets

(56) References Cited

U.S. PATENT DOCUMENTS

| | | | | | |
|---|---|---|---|---|---|
| 3,749,363 | A | * | 7/1973 | Hauser | B65D 90/143 254/45 |
| 3,789,558 | A | * | 2/1974 | Spencer | E04G 21/14 254/92 |
| 3,958,705 | A | * | 5/1976 | Baxter | B60P 1/6436 414/12 |
| 3,986,702 | A | * | 10/1976 | Barber | B65D 90/143 254/45 |
| 3,998,340 | A | * | 12/1976 | Westwood | B60P 1/6436 193/35 R |
| 4,089,271 | A | * | 5/1978 | Pack | B65G 7/02 104/134 |
| 4,765,594 | A | * | 8/1988 | Riedl | B65D 90/143 254/45 |
| 5,035,395 | A | * | 7/1991 | Settlemier | B65G 7/02 248/188.2 |
| 5,056,977 | A | * | 10/1991 | May | B66F 7/0625 414/12 |
| 5,326,213 | A | * | 7/1994 | Roberts | B60P 1/6481 414/392 |
| 5,800,114 | A | * | 9/1998 | Secondi | B66F 3/46 280/43.23 |
| 6,379,085 | B1 | * | 4/2002 | Vanderklaauw | B66F 1/00 405/230 |
| 7,390,140 | B2 | * | 6/2008 | Baber | E02B 3/068 405/2 |
| 9,482,021 | B2 | | 11/2016 | Smith et al. | |
| 2016/0202111 | A1 | * | 7/2016 | Fahey | B65D 90/143 177/141 |

* cited by examiner

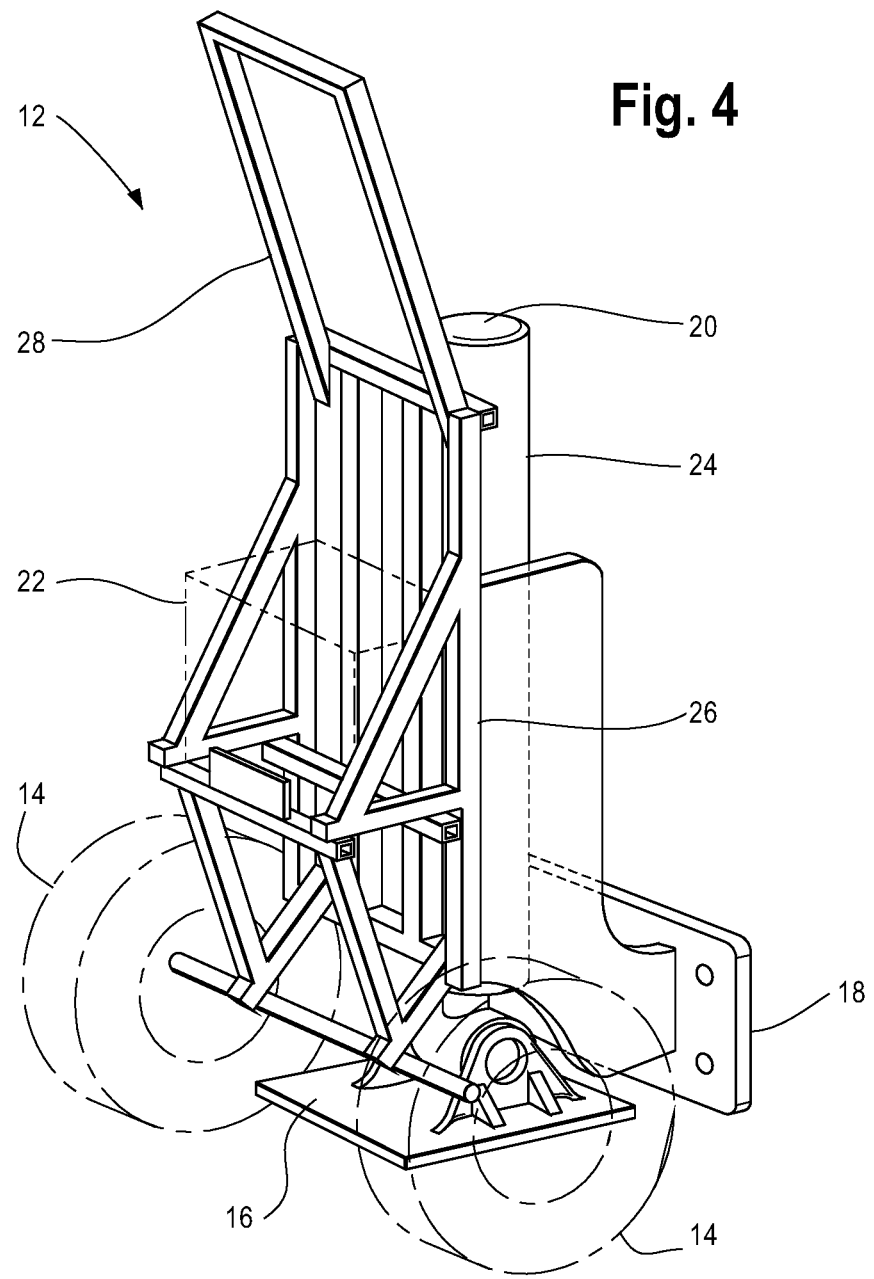

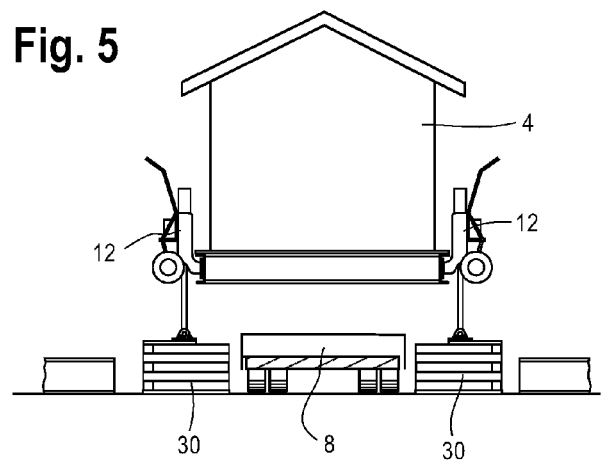
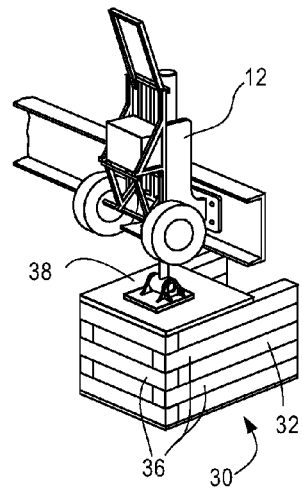
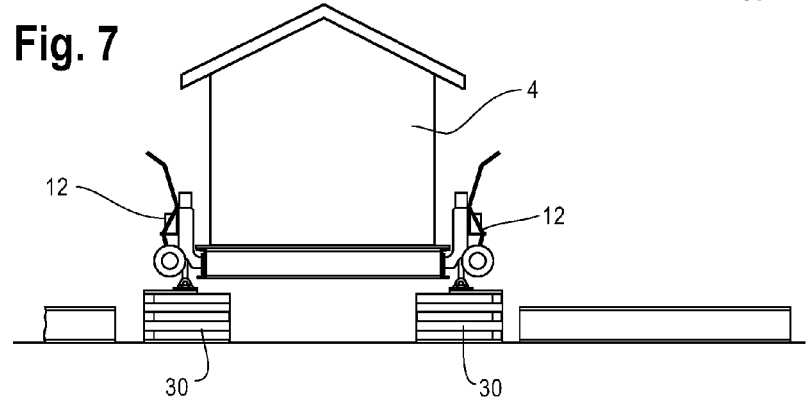
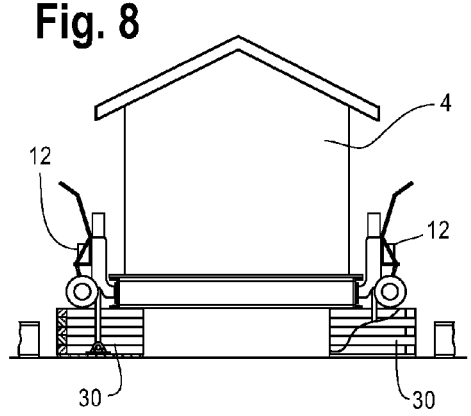
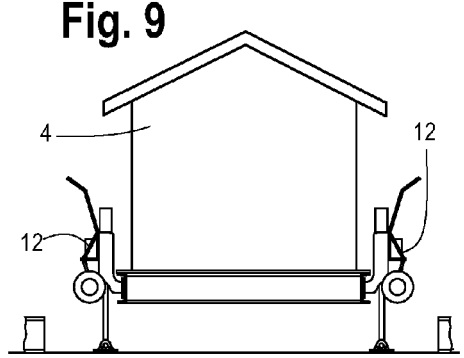

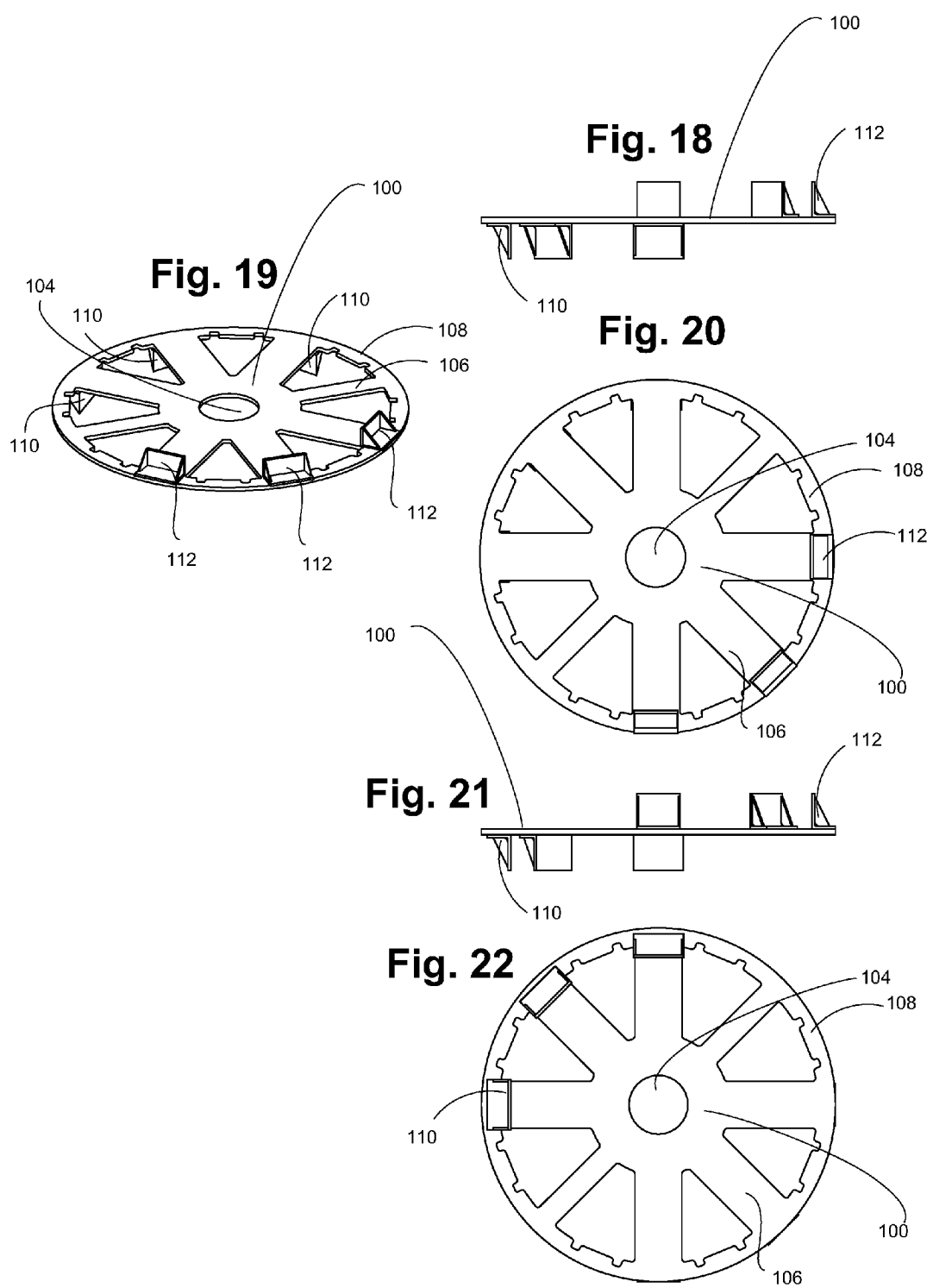

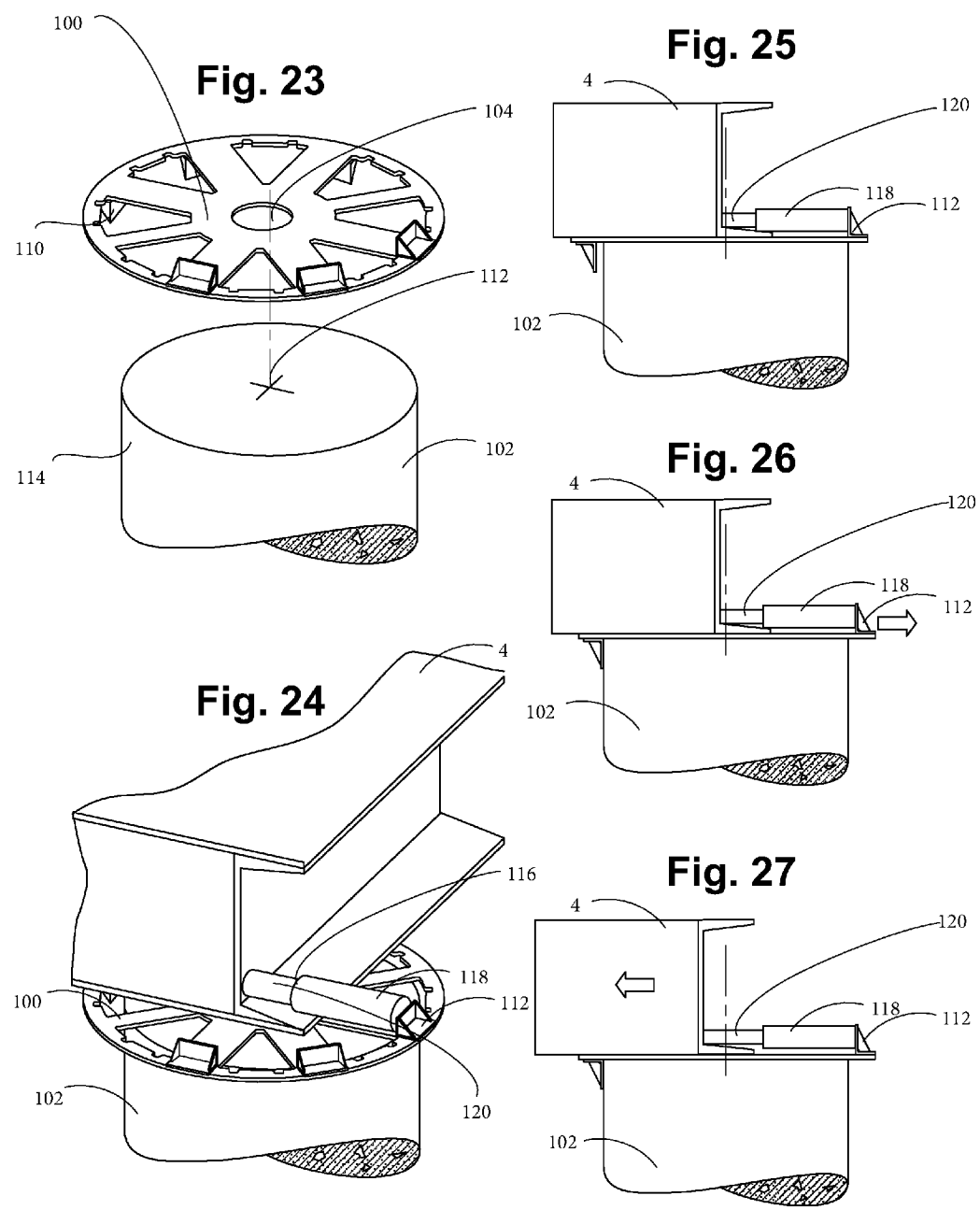

MODULAR ENCLOSURE TRANSFER SYSTEM INCLUDING ROLLERS

CROSS REFERENCE TO RELATED APPLICATIONS

This application is a non-provisional, and claims the benefit of the filing date of, U.S. Provisional Patent Application No. 62/301,897, filed Mar. 1, 2016, entitled "Modular Enclosure Transfer System Including Rollers" The entire contents of U.S. Provisional Application No. 62/301,897 is hereby incorporated by reference.

FIELD OF THE DISCLOSURE

This disclosure relates generally to a system for moving a pre-fabricated enclosure, and more specifically, to a crane-free system for moving a pre-fabricated enclosure employing rotatable rollers on a sliding beam system and a system of coordinated self-contained hydraulic jack units.

BACKGROUND

Pre-fabricated metal enclosures used, for example, at electrical sub-stations are typically unloaded from a semi-trailer using a large mobile crane system. The crane normally attaches to the base of the pre-fabricated enclosure, lifts the pre-fabricated enclosure from the trailer bed, and relocates the enclosure onto a pre-laid foundation. The crane system is sometimes not practical for transferring the pre-fabricated enclosure at a job site due to high voltage overhead power lines, trees, strong winds, or other environmental factors, conditions, or interferences. Additionally, the pre-laid foundation is intended to be level before the pre-fabricated enclosure is placed on it. However, any wobbling or swinging of the pre-fabricated enclosure as it is lowered by the crane makes it difficult to make adjustments to correct for any out-of-level conditions.

Recently, a "slide and lower" modular enclosure system comprising a sliding beam system and a system of coordinated self-contained hydraulic jack units was developed to pull a pre-fabricated metal enclosure off a semi-trailer using winches and slide beams, using a system of coordinated self-contained hydraulic jack units lowers the pre-fabricated enclosure to a pre-laid foundation. A patent application directed to that system was filed by the assignee of the present disclosure. However, the "slide and lower" modular enclosure system does not provide a way to rotate a building using that sliding beam system. Additionally, the "slide and lower" modular enclosure system requires the slide beams to be lifted to exactly the same height as the trailer, which is difficult when the trailer is not level.

SUMMARY OF THE DISCLOSURE

A modular enclosure transfer system is provided comprising rotatable rollers, a beam system, and a system of coordinated self-contained hydraulic jack units. A system of coordinated self-contained hydraulic jack units lift a pre-fabricated metal enclosure off a semi-trailer, using a U-shaped crib if necessary; rotatable rollers are connected to the pre-fabricated metal enclosure; a beam system is used to properly locate the pre-fabricated above a foundation; and the system of coordinated self-contained hydraulic jack units is used to lower the pre-fabricated metal enclosure to the foundation. Prior to the placement of the pre-fabricated enclosure, the foundation is poured at a job site and an initial check is completed to verify the foundation is level using a laser-level system or another method. The foundation may take the form of a concrete slab or a plurality of concrete piers. To transport the pre-fabricated enclosure to the job site for placement, the pre-fabricated enclosure is initially placed on a flatbed semi-trailer. The pre-fabricated enclosure may be wider than the semi-trailer, and the edges of the pre-fabricated enclosure may consequently extend beyond the edges of the semi-trailer. At the job site, the semi-trailer is parked near the pre-laid foundation.

Each of the self-contained hydraulic jack units, which may be transported separately from the pre-fabricated enclosure, is secured to the pre-fabricated enclosure. The system of coordinated self-contained hydraulic jack units comprises at least four self-contained hydraulic jack units. The self-contained hydraulic jack units are preferably connected to a multi-jack unit controller that can adjust the height of all the self-contained hydraulic jack units collectively, i.e. each unit in concert with the other self-contained hydraulic jack units. Alternately, each self-contained hydraulic jack unit can be adjusted independently using an independent controller associated solely with that self-contained hydraulic jack unit. Each self-contained hydraulic jack unit comprises wheels for moving the self-contained hydraulic jack unit when it is not attached to the enclosure, a base for lifting the self-contained hydraulic jack unit to the level of the pre-fabricated enclosure and later for supporting the pre-fabricated enclosure, a connecting plate for attaching to the pre-fabricated enclosure, a cylinder for lowering and/or raising the pre-fabricated enclosure, a power unit containing a battery for controlling and powering the self-contained hydraulic jack unit, and a counterbalanced hydraulic valve system to prevent unwanted cylinder retraction. Each self-contained hydraulic jack unit is adapted to move between an upright position in which the self-contained hydraulic jack unit rests upon the base and a tipped position in which the self-contained hydraulic jack unit rests upon the wheels.

To connect the self-contained hydraulic jack units to the pre-fabricated enclosure, each self-contained hydraulic jack unit is wheeled in a tipped position to semi-trailer. The base of each self-contained hydraulic jack unit is placed on the ground or on a wooden block next to the semi-trailer. Each self-contained hydraulic jack unit is then rotated on its base into an upright position. Once in the upright position, the connecting plate of each self-contained hydraulic jack unit is inserted between the two flanges of the C-channel at the base of the pre-fabricated enclosure so that it can be bolted or otherwise fastened to the vertical web of the C-channel. The connecting plate secures each self-contained hydraulic jack unit to the pre-fabricated enclosure.

The pre-fabricated enclosure is lifted off the semi-trailer using the system of coordinated self-contained hydraulic jack units. If, after the pre-fabricated enclosure has been lifted as far as the self-contained hydraulic jacks allow, additional clearance is needed between the semi-trailer and the pre-fabricated enclosure for the semi-trailer to pull out from underneath the pre-fabricated enclosure, U-shaped cribs may be placed around the jacks. The U-shaped cribs may be formed by a number of layers of wood separated by metal, such that the height of the U-shaped cribs may be varied. Once the U-shaped cribs are in place, the pre-fabricated enclosure may be lowered by the system of coordinated self-contained hydraulic jack units and set upon the U-shaped cribs. A metal plate may be put on a portion of the top of each U-shaped crib, and the self-contained hydraulic jack units may be raised onto the metal plates while still attached to the pre-fabricated enclosure. The self-contained hydraulic jacks may then lift the pre-fabricated enclosure to a height that allows the semi-trailer to pull out from underneath the pre-fabricated enclosure. After removal of the semi-trailer, the process is essentially reversed, so that the pre-fabricated enclosure may then be set back down on the U-shaped cribs, the self-contained hydraulic jacks may be placed on the ground, and the U-shaped cribs may be removed.

Rotatable rollers are connected to the C-channel at the base of the pre-fabricated enclosure. Each rotatable roller comprises roller body, a rotatable connection plate, and a beam guide. The beam guide may comprise a pair of upper flange rollers that roll on the top of the uppermost horizontal flange of a beam that is an I-beam, a pair of lower flange rollers connected to the upper flange rollers that roll on the bottom of the uppermost horizontal flange of the beam, and a pair of side rollers that roll on the sides of the uppermost horizontal flange of the beam. Rotatable rollers are connected to the pre-fabricated enclosure in pairs such that a beam is connected to the building by two rotatable rollers, one on each side of the pre-fabricated building. The beams should be placed at least as frequently as every twelve feet along the length of the pre-fabricated enclosure. In one embodiment of the beam system for an eighteen foot enclosure, a beam is placed every nine feet along the length of the pre-fabricated enclosure for a total of three slide beams. Each rotatable connection plate is connected to the C-channel at the base of the pre-fabricated building with the roller body positioned below the pre-fabricated building. A beam that is an I-beam is inserted into the beam guides of each rotatable roller, and blocks or other support may be provided beneath each beam. In some embodiments of the present disclosure, two beams are used to move each pre-fabricated enclosure. Once the beams are secured by the rotatable rollers and supported from below by blocks or the ground, the pre-fabricated enclosure may be lowered down onto the beams.

Once lowered, the pre-fabricated enclosure may be rolled across the beams on the rotatable rollers. A winch is provided on top of each beam guide, and a cable can run from each winch to a hook at the end of the respective beam. As the winch winds the cable in, reducing the amount of exposed cable, the rollers of the roller body rotate, slowly moving the pre-fabricated building across the beams. The beam guides keeps the roller bodies centered on the beams as the pre-fabricated enclosure is pulled across the beams. Blankets may be draped over the cables and beams to contain cable fragments in the event of a cable failure. The winches are powered by the power units on the self-contained hydraulic jack units.

If the building needs to be moved in a direction that is not perpendicular to the sides of the building to which the rotatable rollers are attached, the building may be lifted by the self-contained hydraulic jacks. Each roller body may be rotated relative to the rotatable connection plate such that beams are at a non-perpendicular angle relative to the sides of the building, and the building may be placed back down upon the angled beams. The pre-fabricated building may then be moved in the desired direction.

Once the pre-fabricated enclosure is properly positioned over the pre-laid foundation, the multi-jack unit controller may be used to lower the bases of the self-contained hydraulic jack units the ground and to raise the pre-fabricated enclosure slightly. Once the self-contained hydraulic jack units are supporting the pre-fabricated enclosure, the beam system may be disassembled and removed.

Once the beam system has been completely removed, the pre-fabricated enclosure can lowered using the multi-jack unit controller simultaneously by all of the self-contained hydraulic jack units onto the pre-laid foundation in a single step. Alternately, the self-contained hydraulic jack units may be operated independently using independent controllers and/or the pre-fabricated enclosure may be lowered in a series of steps. For example, the pre-fabricated enclosure may be partially lowered, the pre-laid foundation may undergo a secondary check to ensure that it is level and be adjusted by shimming as necessary, and then the pre-fabricated enclosure may be lowered the remaining distance on to the pre-laid foundation.

BRIEF DESCRIPTION OF THE DRAWINGS

FIG. 4 illustrates an isometric view of a self-contained hydraulic jack unit;

FIG. 5 illustrates a side view of the pre-fabricated enclosure supported in a lofted position over the semi-trailer by the system of coordinated self-contained hydraulic jack units on U-shaped cribs;

FIG. 6 illustrates an isometric view of a U-shaped crib supporting a self-contained hydraulic jack that is attached to the pre-fabricated enclosure;

FIG. 7 illustrates a side view of the pre-fabricated enclosure supported in a lofted position by the system of coordinated self-contained hydraulic jack units after the semi-trailer is driven away;

FIG. 8 illustrates a side view of the pre-fabricated enclosure supported by the U-shaped cribs while the self-contained hydraulic jack units are lowered.

FIG. 9 illustrates a side view of the pre-fabricated enclosure after the U-shaped cribs have been removed from below the system of coordinated self-contained hydraulic jack units;

FIG. 18 illustrates an isometric view of a centering device used to center the pre-fabricated enclosure on a pier.

FIG. 19 illustrates a right side view of the centering device of FIG. 18.

FIG. 20 illustrates a top view of the centering device of FIG. 18.

FIG. 21 illustrates a left side view of the centering device of FIG. 18.

FIG. 22 illustrates a bottom view of the centering device of FIG. 18.

FIG. 23 illustrates the alignment of the centering device and a pier onto which the pre-fabricated enclosure is placed.

FIG. 24 illustrates an isometric view of a hydraulic ram engaging with a centering device to center a pre-fabricated enclosure on a pier.

FIG. 25 is a side view of a hydraulic ram inserted between a centering device and a pre-fabricated enclosure on a pier.

FIG. 26 illustrates the hydraulic ram of FIG. 25 exerting force on an upward prong of the centering device as it engages the pre-fabricated enclosure.

FIG. 27 illustrates the hydraulic ram of FIGS. 25 and 26 extending to move the pre-fabricated enclosure.

DETAILED DESCRIPTION OF THE PREFERRED EMBODIMENTS

Figure 1:
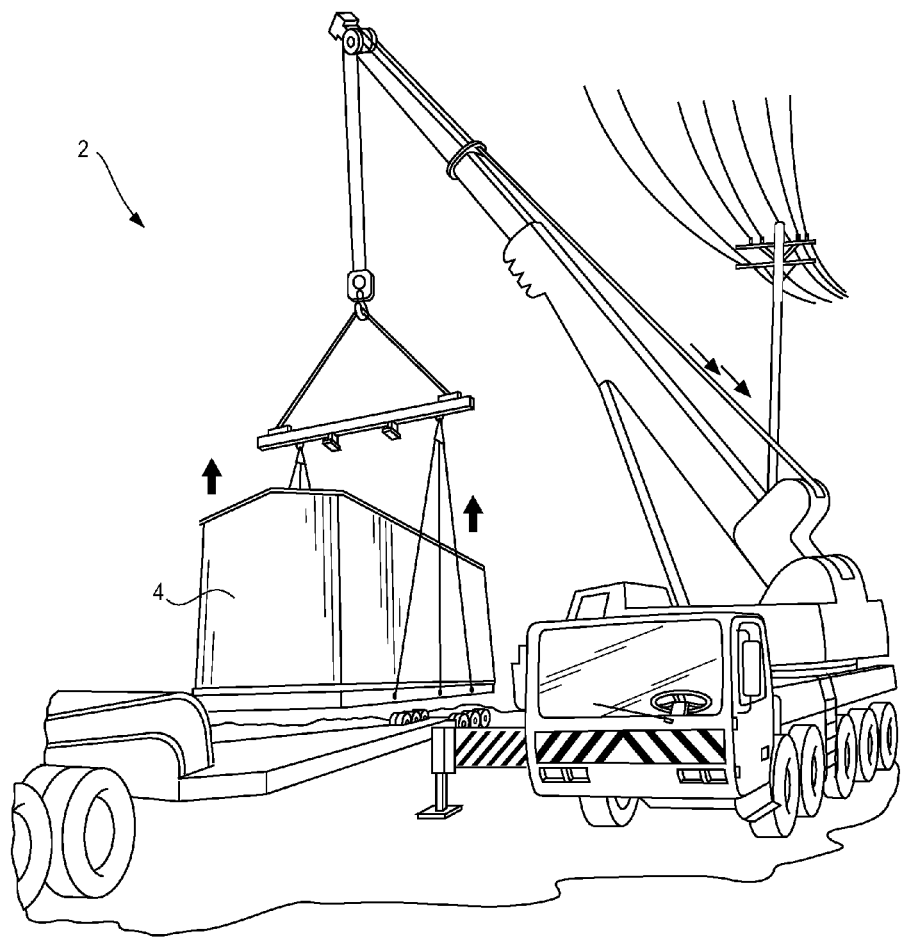
FIG. 1 illustrates an example of the crane systems conventionally employed to move pre-fabricated enclosures and the disadvantages associated with such crane systems.

FIG. 1 illustrates an example of the crane systems 2 currently employed to move pre-fabricated enclosures 4 and the disadvantages associated with such crane systems 2. Crane systems 2 are not optimal for moving pre-fabricated enclosures 4 for a number of reasons. Crane systems 2 may come into contact with the overhead power lines, potentially damaging or breaking the overhead power lines and creating an electrical risk for workers on the job site. In certain circumstances, the presence of overhead power lines, trees, or other obstructions, may prevent an otherwise desirable location for a pre-fabricated enclosure 4 from being used because the pre-fabricated enclosure 4 cannot be placed without interference using a crane system 2. Crane systems 2 are also not optimal for moving pre-fabricated enclosures during inclement weather. Finally, the pre-laid foundation at a job site occasionally needs to be adjusted to be level as the pre-fabricated enclosure 4 is placed. Correcting for any out-of-level conditions of the pre-laid foundation using a crane system 2 is difficult due to the sway of the pre-fabricated enclosure 4 while it is hanging from the crane system 2, particularly in windy conditions.

Figure 2:
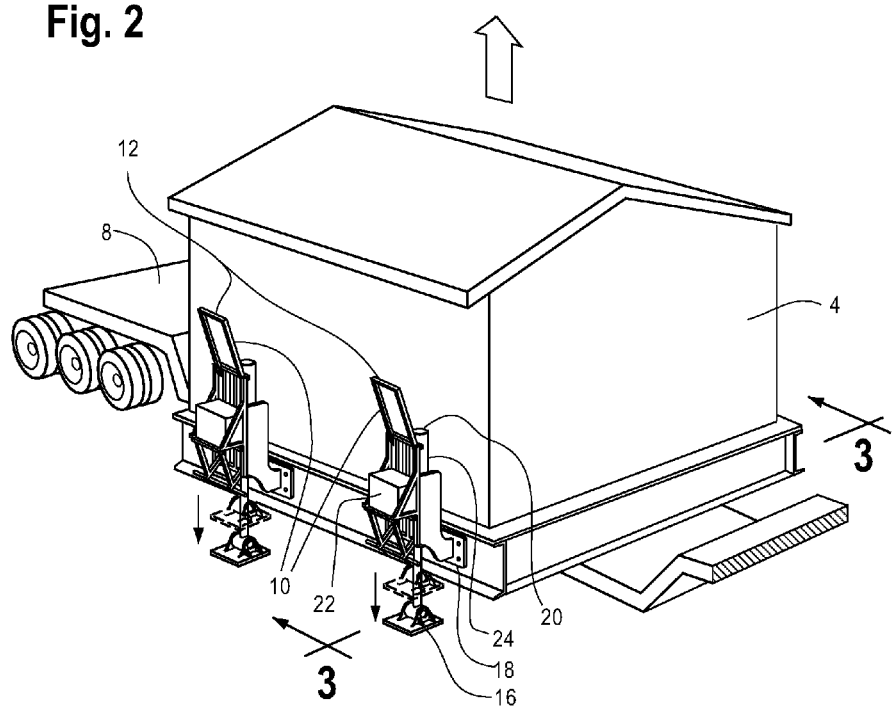
FIG. 2 illustrates an isometric view of a system of coordinated self-contained hydraulic jack units of the present disclosure being attached to the pre-fabricated enclosure and used to lift the pre-fabricated building off of the semi-trailer.

FIG. 2 depicts an initial step in using the system of the present disclosure to move a pre-fabricated enclosure 4 off a semi-trailer 8. FIG. 2 is an isometric view of a system of coordinated self-contained hydraulic jack units 10 being attached to the pre-fabricated enclosure 4. The system of coordinated self-contained hydraulic jack units 10 comprises one or more self-contained hydraulic jack units 12 and a multi-jack unit controller (not pictured). Each self-contained hydraulic jack unit 12 comprises wheels 14 (not pictured in FIG. 2, shown in FIG. 3), a base 16, a connecting plate 18, a cylinder 20, a power unit 22 comprising a battery, a counterbalanced hydraulic valve system 24, and an independent controller (not pictured). Each self-contained hydraulic jack unit is adapted to move between an upright position in which the self-contained hydraulic jack unit 12 rests upon the base 16 and a tipped position in which the self-contained hydraulic jack unit 12 rests upon the wheels 14. Each self-contained hydraulic jack unit 12 is wheeled upon its wheels 14 in a tipped position to the pre-fabricated enclosure 4. The base 16 may then be placed upon a block, which may be made of wood, or may simply be placed on the ground. The self-contained hydraulic jack unit 12 is pivoted into its upright position. Once in an upright position, the height of the self-contained hydraulic jack unit 12 may be adjusted by the cylinder 20 until the connecting plate 18 of the self-contained hydraulic jack unit 12 is at the proper height to be connected to the pre-fabricated enclosure 4.

Figure 3:
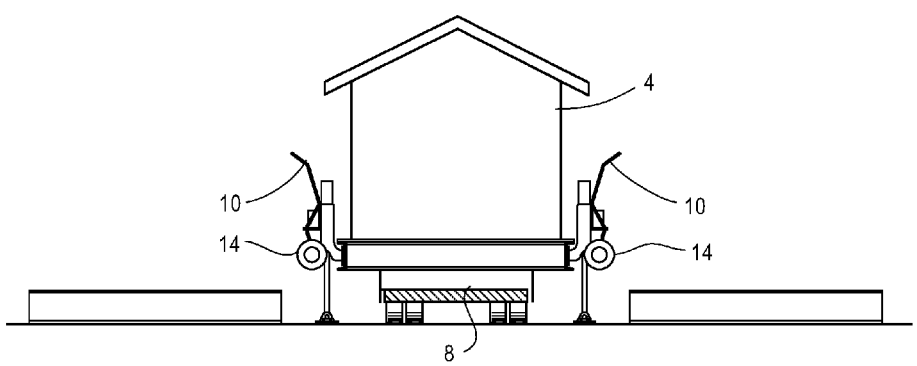
FIG. 3 illustrates a side view of the pre-fabricated enclosure after being lifted by the system of coordinated self-contained hydraulic jack units off of the semi-trailer.

In some embodiments, the connecting plate 18 is dimensioned to fit between the flanges of the C-channel at the base of the pre-fabricated enclosure 4 and be fastened into the web of the C-channel at the base of the pre-fabricated enclosure 4. As depicted by the upward pointing arrow in FIG. 2, the system of self-contained hydraulic jack units 10 is used to lift the pre-fabricated enclosure off the semi-trailer 8. The actuable cylinder 20 of each self-contained hydraulic jack unit 36 may be controlled by a multi-jack unit controller (not depicted), which is located slightly away from the pre-fabricated enclosure 4. The multi-jack unit controller may be used to simultaneously adjust the height all of the cylinders of all of the self-contained hydraulic jack units 12. The adjustment of the cylinders causes the pre-fabricated enclosure 4 to move up or down when the self-contained hydraulic jack units 12 are connected to the enclosure. FIG. 3 illustrates a side view of the pre-fabricated enclosure 4 after being lifted by the system of coordinated self-contained hydraulic jack 10 units off of the semi-trailer 8.

FIG. 4 illustrates an isometric view of a self-contained hydraulic jack unit 12. The self-contained hydraulic jack unit 12 is in an upright position and is set upon its base 16. The cylinder 20, containing the counterbalanced hydraulic valve system 24, extends vertically upward from the base 16, and a supporting structure 26 is connected to the cylinder 20 and moves with the cylinder 20 when the cylinder 20 is extended or retracted. The cylinder typically has a height in the range of 16 to 22 inches. A connecting plate 18 is connected to the supporting structure 26 on one side, and a power unit 22 and wheels 14 are connected on the other side. In some embodiments, the battery in the power unit 22 is a 12-volt battery. The self-contained hydraulic jack unit 12 may be moved into a tipped position by being tipped off its base 16 and onto its wheels 14 when the cylinder is completely retracted. The self-contained hydraulic jack unit 12, which may weigh 300 pounds, is thus adapted to be easily transported around a job site, similar to maneuvering a dolly. The top of the supporting structure 26 may comprise a handle 28 to facilitate wheeling the self-contained hydraulic jack unit 12 in its tipped position. Once the self-contained hydraulic jack units 12 are connected to the pre-fabricated enclosure 4, the self-contained hydraulic jack units 12 are ready for use to raise or lower the pre-fabricated enclosure 4.

In certain circumstances, the pre-fabricated enclosure 4 may need to be lifted higher than the system of self-contained hydraulic jack units 10 accommodates in order for the semi-trailer 8 to have sufficient clearance to be pulled out from underneath the pre-fabricated enclosure. FIG. 5 illustrates a side view of the pre-fabricated enclosure 4 after U-shaped cribs 30 have been placed around each self-contained hydraulic jack unit 12, the pre-fabricated enclosure 4 has been set upon the U-shaped cribs 30, the self-contained hydraulic jack units 12 have been repositioned on top of the U-shaped cribs 30, and the building has been lifted by the system of self-contained hydraulic jack units on the U-shaped cribs again. In some embodiments within the scope of the present disclosure, the U-shaped crib is first placed upon a wooden pad 74. FIG. 6 depicts a U-shaped crib 30 on a wooden pad 74 supporting a self-contained hydraulic jack unit 12 that is attached to the pre-fabricated enclosure 4. In some embodiments, the U-shaped crib 30 has two parallel sides 32 and a perpendicular connecting side 34 (not visible) connecting an end of one parallel side 32 to an end of the other parallel side 32. The width of the perpendicular connecting side 34 must be greater than the width of a self-contained hydraulic jack unit 12 so that the U-shaped crib can be placed around a self-contained hydraulic jack unit 12, and the length of the parallel sides 32 may be greater than the length of a self-contained hydraulic jack unit 12.

The U-shaped crib 30 may have multiple layers 36 that can be stacked on top of one another such that the overall height of the U-shaped crib 30 can be adjusted by adding or removing a layer 36. A metal plate 38 may be placed on top of the U-shaped crib to provide additional surface area upon which a self-contained hydraulic jack unit 12 may be placed. Metal plates 38 may also be placed between each layer 36. FIG. 7 illustrates a side view of the pre-fabricated enclosure 4 depicted in FIG. 5 after the semi-trailer 8 has been driven away. FIG. 8 illustrates a side view of the pre-fabricated enclosure 4 supported by the U-shaped cribs 30 while the self-contained hydraulic jack units 12 are lowered. The metal plates 38 have been removed, and the self-contained hydraulic jack units 12 are supported by their attachment to the pre-fabricated enclosure 4. FIG. 9 illustrates the side view of the pre-fabricated enclosure 4 depicted in FIG. 7 after the self-contained hydraulic jack units 12 have been placed on the ground the U-shaped cribs 30 have been removed.

Figure 10:
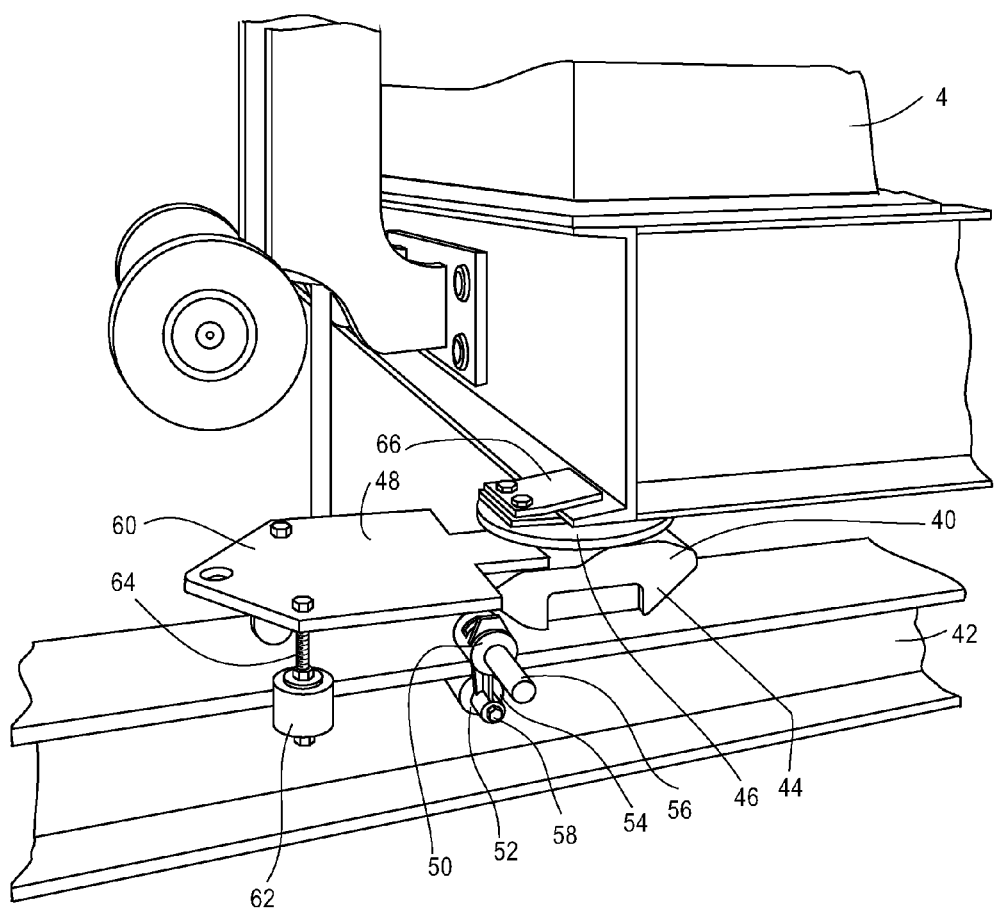
FIG. 10 illustrates an isometric view of a rotatable roller connected to a pre-fabricated building and a beam.

FIG. 10 depicts rotatable roller 40 connected to a pre-fabricated enclosure 4 and a beam 42. The rotatable roller 40 comprises a roller body 44, a rotatable connection plate 46, and a beam guide 48. The roller body may be a commercially available roller, such as a model FT series 7.5-SLP roller from Hilman Inc., Marlboro, N.J. The rotatable connection plate 46 may include a grip 66 that fits over the flange of the C-channel of the pre-fabricated building 4 or the rotatable connection plate 46 may be connected to the pre-fabricated building in another manner. The rotatable connection plate 40 should be connected to the roller body 44 by a mechanism that allows the rotatable connection plate 40 to rotate relative to the roller body 44.

Figure 11:
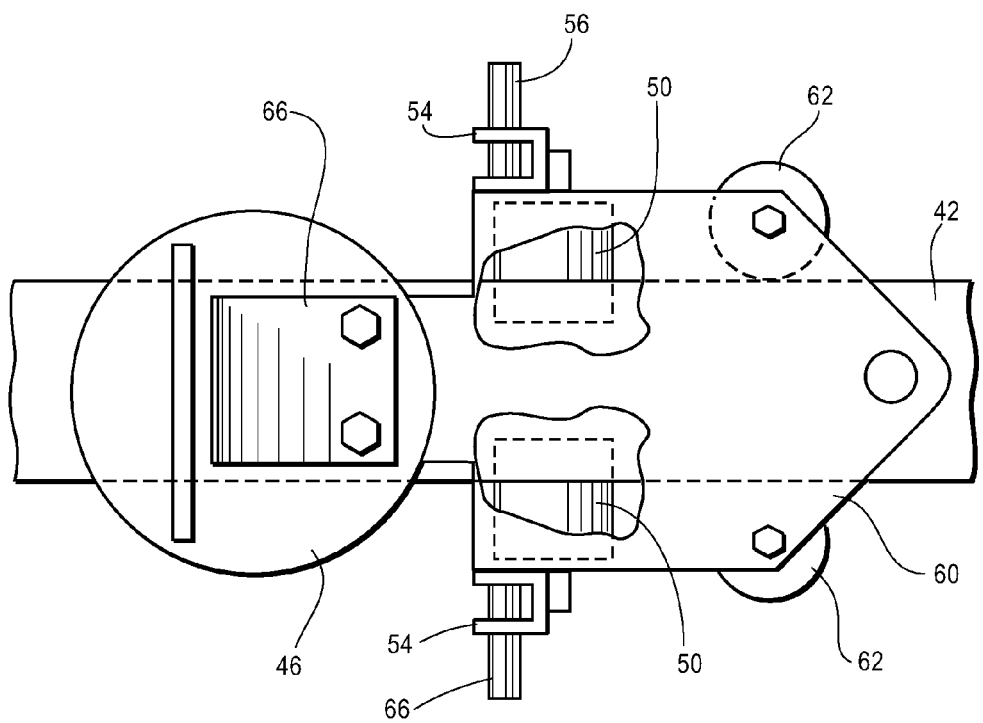
FIG. 11 illustrates a top view of a rotatable roller.
Figure 12:
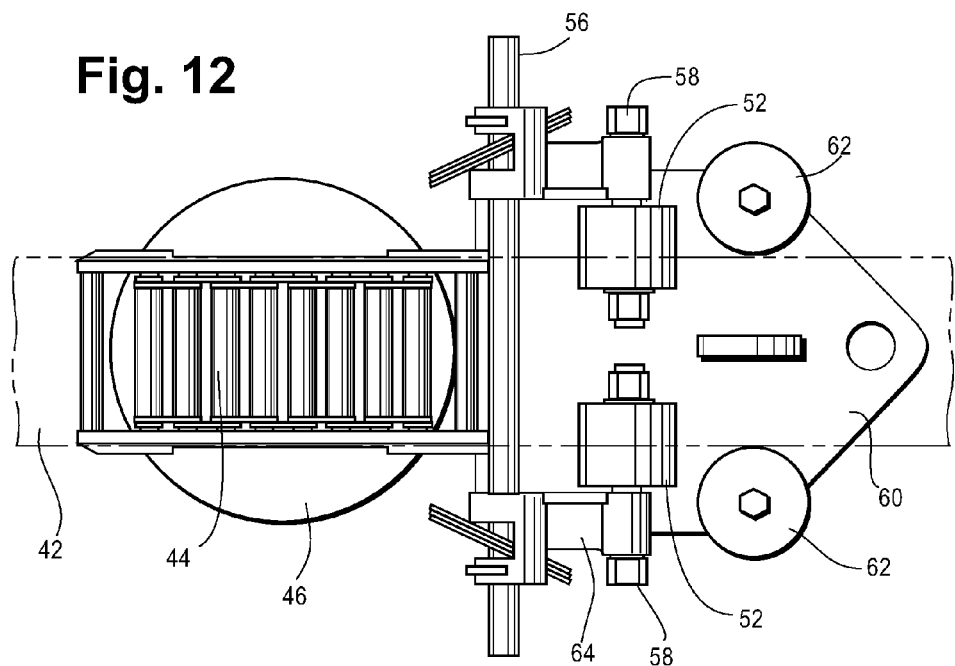
FIG. 12 illustrates a bottom view of a rotatable roller.
Figure 13:
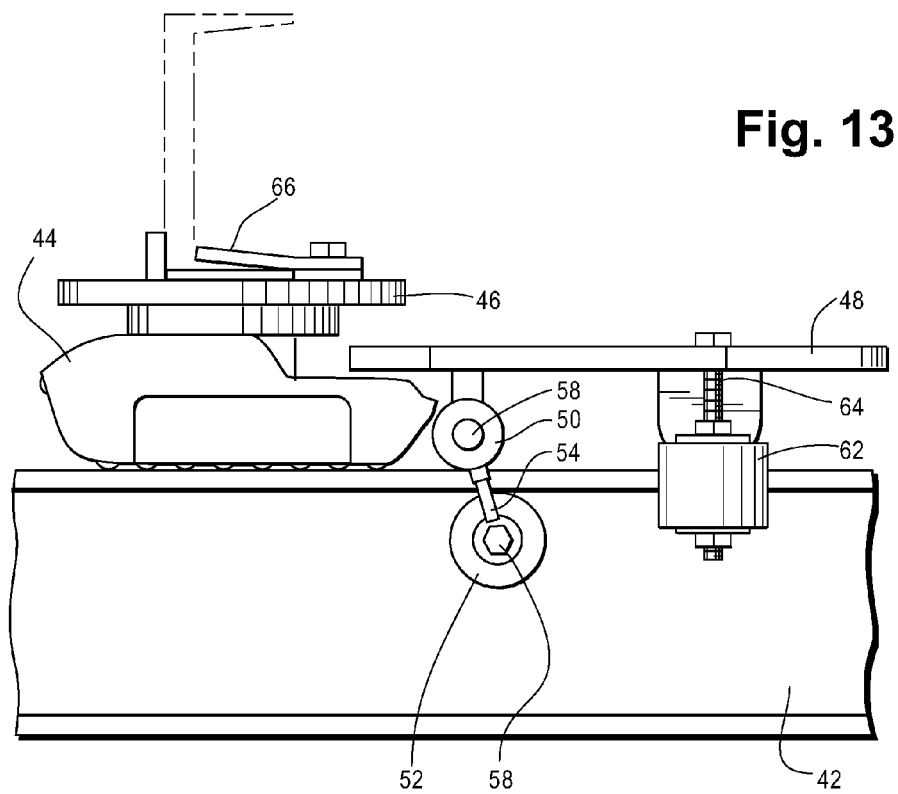
FIG. 13 illustrates a side view of a rotatable roller on a beam.

The beam guide 48 has a pair of upper flange rollers 50 that roll on the top of the uppermost flange of beam 42. A pair of lower flange rollers 52 roll on the bottom of the uppermost horizontal flange of the beam 42, and a flange roller connector 54 connects a upper rod 56 going through the axis of the upper flange rollers 50 and lower rods 58 going through the axis of each lower flange roller 52 on either side of the beam 42, such that the lower flange rollers 52 hang below the upper flange rollers 50. The top of each flange roller connector 54 is connected to a beam guide plate 60. The beam guide 48 also has a pair of side rollers 62 that roll along the sides of the uppermost flange of the beam 42. Each side roller 62 is connected to the beam guide plate 60 by a side roller rod 64 that extends vertically through the axis of the side roller 62 and is secured to the guide plate 60 by a bolt or other securing mechanism. FIGS. 11, 12, and 13 depict the rotatable roller 40 from a top, bottom, and side view respectively.

Figure 14:
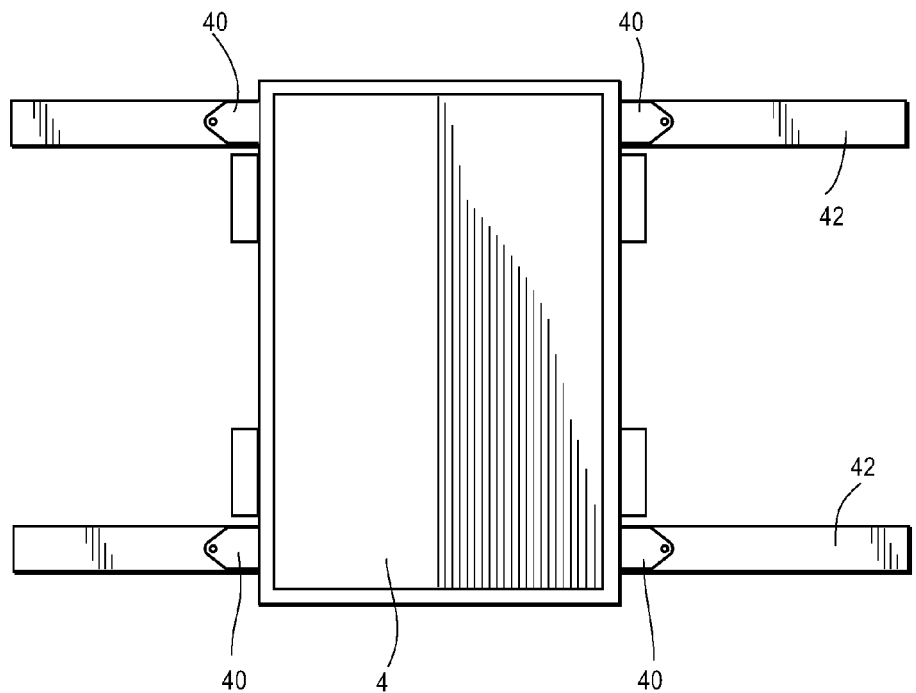
FIG. 14 illustrates a top view of a pre-fabricated enclosure connected to four rotatable rollers that are in engagement with two beams.
Figure 15:
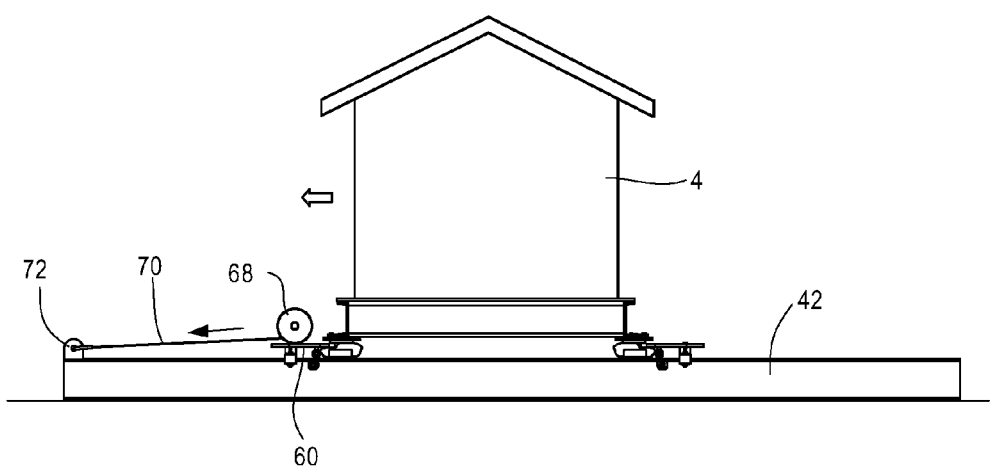
FIG. 15 illustrates a side view of the beam system as the pre-fabricated enclosure is beginning to be rolled across the sliding beam system.
Figure 16:
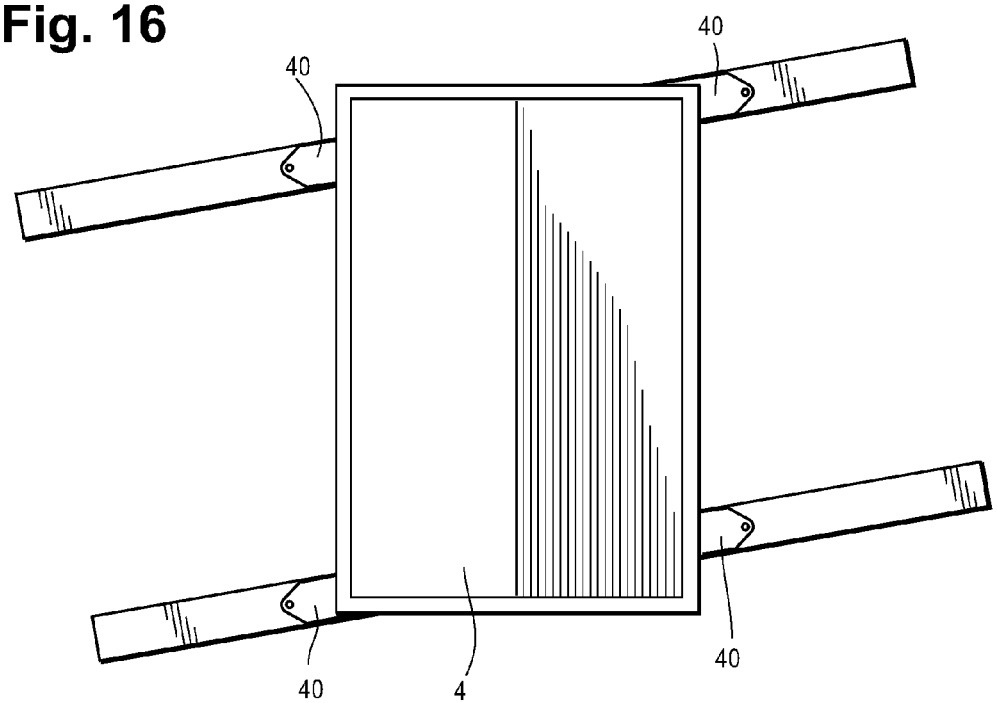
FIG. 16 illustrates a top view of the pre-fabricated enclosure connected to the four rotatable rollers that have been rotated from the position depicted in FIG. 14 and are in engagement with the two beams.

FIG. 14 illustrates a top view of a pre-fabricated enclosure 4 connected to four rotatable rollers 40 that are in engagement with two beams 42. The beams 42 are aligned perpendicularly to the sides of the pre-fabricated enclosure 4 to which the rotatable rollers 40 are attached. FIG. 15 illustrates a side view of the beam system 6 as the pre-fabricated enclosure 4 is beginning to be rolled across the beams 42. In an embodiment, a winch 68 is secured to each beam guide plate 60 located on the side of the pre-fabricated enclosure that the pre-fabricated enclosure 4 will be moved. A cable 70 runs between each winch 68 and a hook 72 located at the end of each beam 42. Each wench 68 may be powered by a power unit 22 comprising a battery of a self-contained hydraulic jack unit 12 (depicted in FIG. 2). When the winches are powered and begin to rotate, the rollers on the bottoms of each roller body 44 begin to rotate toward the hooks 72 at the end of the beams 42, and the pre-fabricated enclosure 4 is moved in that direction. Blankets may be draped over the cables to contain cable fragments in the event of a cable 30 FIG. 16 depicts a top view of the pre-fabricated enclosure 4 connected to the four rotatable rollers 40 that have been rotated from the position depicted in FIG. 14 and are in engagement with the two beams 42.

Figure 17:
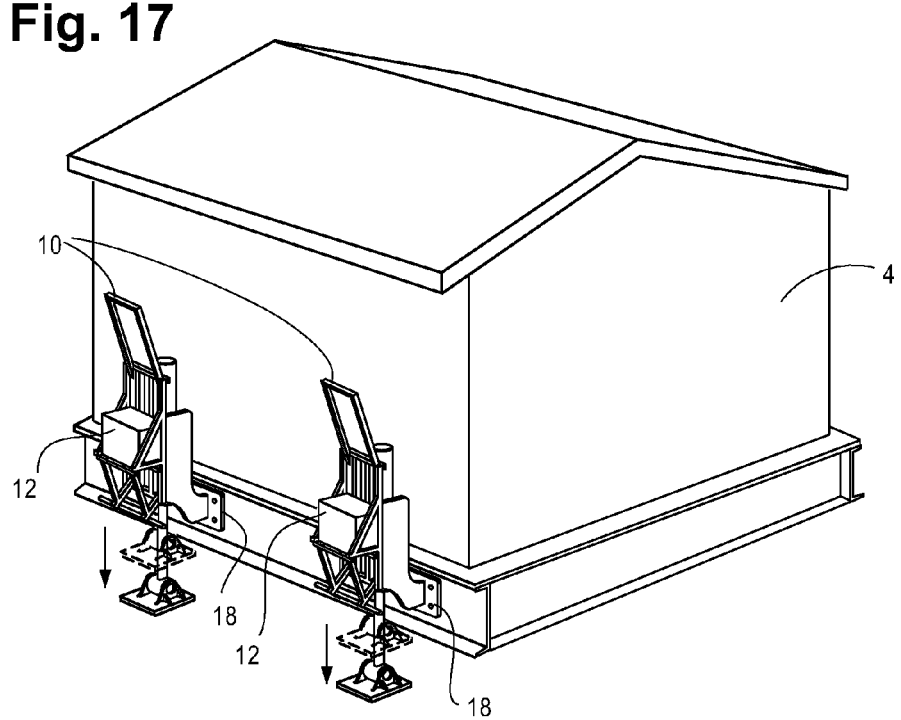
FIG. 17 illustrates an isometric view of the system of coordinated self-contained hydraulic jack units lowering the pre-fabricated enclosure to the pre-laid foundation.

FIG. 17 illustrates an isometric view of the system of coordinated self-contained hydraulic jack units 10 lowering the pre-fabricated enclosure 4 to the ground. Although not depicted, generally the ground will be prepared with a pre-laid foundation comprised of concrete piers that are three- to four-feet deep and preferably laser-leveled with one another. Alternately, the foundation may be a concrete slab or have another suitable configuration. After placement of the pre-fabricated enclosure 4, the connecting plate 18 of each self-contained hydraulic jack unit 12 may be disconnected from the pre-fabricated enclosure 4. Each self-contained hydraulic jack unit 12 may then be tipped from an upright position to a tipped position and wheeled away. FIG. 18 illustrates an isometric view of a centering device 100 used to center the pre-fabricated enclosure 4 on a pier 102. The centering device 100 has a wagon-wheel configuration with a central hub 104, spokes 106, and a circular outer edge 108. On one side of the centering device 100, downward prongs 110 extend below the circular outer edge 108. On the opposite side, upward prongs 112 extend upward above the circular outer edge 108. FIG. 19 illustrates a right side view of the centering device 100 of FIG. 18. FIG. 20 illustrates a top view of the centering device 100 of FIG. 18. FIG. 21 illustrates a left side view of the centering device 100 of FIG. 18. FIG. 22 illustrates a bottom view of the centering device 100 of FIG. 18.

FIG. 23 illustrates the alignment of the centering device 100 on the pier 102 onto which the pre-fabricated enclosure 4 is placed. The central hub 104 of the centering device 100 is aligned with the center 112 of the pier 102. When placed upon the pier 102, the downward prongs 110 are adjacent to the side 114 of the pier 102.

FIG. 24 illustrates an isometric view and FIG. 25 illustrates a side view of a hydraulic ram 116 engaging with the centering device 100 to center the pre-fabricated enclosure 4 on the pier 102. A first end 118 of the hydraulic ram 116 is placed against an upward prong 112 of the centering device 110, and a second end 120 of the hydraulic ram is extended to press against the pre-fabricated enclosure 4. The first end 118 of the hydraulic ram 116 exerts force against the upward prong 112 as the hydraulic ram 116 is extended, as shown in FIG. 26. In response, as shown in FIG. 27, the pre-fabricated enclosure 4 moves in the direction that the hydraulic ram 116 is pushing. The hydraulic ram 116 may be extended until the pre-fabricated enclosure 4 is properly centered on the pier 102.

What is claimed is:

1. A pre-fabricated enclosure transfer system, comprising:
   a beam system comprising a beam, a roller body, a cable, and a winch;

a system of coordinated self-contained hydraulic jack units comprising a plurality of self-contained hydraulic jack units, each self-contained hydraulic jack unit comprising a pair of wheels, a base, a connecting plate, an actuable cylinder comprising a counterbalanced hydraulic valve system, and a power unit;

wherein the roller body is connected to a beam guide comprising a beam guide plate; and wherein the beam guide comprises upper flange rollers joined by an upper rod running axially through each upper flange roller, lower flange rollers joined by a lower rod running axially through each lower flange roller, and a flange roller connector connected to the beam guide plate and connecting the upper rod to the lower rod.

2. The pre-fabricated enclosure transfer system of claim 1, wherein the flange roller connector is sized such that the upper flange rollers roll on the top of an uppermost horizontal flange of the beam and the lower flange rollers roll on the bottom of the uppermost horizontal flange of the beam.

3. The pre-fabricated enclosure transfer system of claim 1, wherein side rollers are connected to the beam guide plate by side roller rods.

4. The pre-fabricated enclosure transfer system of claim 1, wherein a rotatable connection plate is rotatably attached to the roller body.

5. The pre-fabricated enclosure transfer system of claim 4, wherein the rotatable connection plate comprises a grip for connection to a pre-fabricated enclosure.

6. The pre-fabricated enclosure transfer system of claim 1, further comprising a U-shaped crib.

7. The pre-fabricated enclosure transfer system of claim 6, wherein each U-shaped crib comprises layers and a metal plate.

8. The pre-fabricated enclosure transfer system of claim 7, wherein each U-shaped crib comprises a metal plate between each layer and a metal plate on top of the uppermost layer.

* * * * *